US012312145B2

(12) United States Patent
Payant

(10) Patent No.: US 12,312,145 B2
(45) Date of Patent: May 27, 2025

(54) PACKAGES, PACKAGED PRODUCTS AND METHODS OF USE

(71) Applicant: AMCOR FLEXIBLES NORTH AMERICA, INC., Neenah, WI (US)

(72) Inventor: Michele C. Payant, Neenah, WI (US)

(73) Assignee: Amcor Flexibles North America, Inc., Neenah, WI (US)

( * ) Notice: Subject to any disclaimer, the term of this patent is extended or adjusted under 35 U.S.C. 154(b) by 46 days.

(21) Appl. No.: 17/919,076

(22) PCT Filed: Jun. 19, 2020

(86) PCT No.: PCT/US2020/038767
§ 371 (c)(1),
(2) Date: Oct. 14, 2022

(87) PCT Pub. No.: WO2021/257099
PCT Pub. Date: Dec. 23, 2021

(65) Prior Publication Data

US 2023/0159251 A1 May 25, 2023

(51) Int. Cl.
*B65D 77/20* (2006.01)
*B32B 27/08* (2006.01)
(Continued)

(52) U.S. Cl.
CPC .......... *B65D 77/2036* (2013.01); *B32B 27/08* (2013.01); *B32B 27/10* (2013.01);
(Continued)

(58) Field of Classification Search
CPC ...... B65D 77/2036; B65D 1/34; B65D 25/14; B65D 2577/2091; B65D 77/2024;
(Continued)

(56) References Cited

U.S. PATENT DOCUMENTS 4,865,217 A 9/1989 Yoshimoto
5,423,449 A 6/1995 Gordon et al.
(Continued)

FOREIGN PATENT DOCUMENTS

DE 102018123453 A1 * 3/2020 ............... B32B 1/00
FR 2682935 A1 4/1993
(Continued)

OTHER PUBLICATIONS

English translation. (Year: 2025).*
PCT International Search Report, International Application No. PCT/US2020/038767, issued Sep. 25, 2020, 3 pages.

*Primary Examiner* — James N Smalley

(57) ABSTRACT

A package includes a lid with a peel initiator portion and a remaining portion. The package further includes a tray. The tray includes a rigid component and a liner component including a liner-flange portion. The package further includes an adhered area which includes a seal between the peel initiator portion and the liner component. A lid-flange portion includes the peel initiator portion and the remaining portion. The adhered area includes the lid-flange portion of the peel initiator portion and the liner-flange portion. Further, the adhered area includes 90 percent or less of an area of the peel initiator portion.

17 Claims, 9 Drawing Sheets

(51) Int. Cl.

| | |
|---|---|
| ***B32B 27/10*** | (2006.01) |
| ***B32B 27/30*** | (2006.01) |
| ***B32B 27/36*** | (2006.01) |
| ***B65D 1/34*** | (2006.01) |
| ***B65D 25/14*** | (2006.01) |

(52) U.S. Cl.
CPC ............ *B32B 27/306* (2013.01); *B32B 27/36* (2013.01); *B65D 1/34* (2013.01); *B65D 25/14* (2013.01); *B32B 2307/7244* (2013.01); *B32B 2307/7246* (2013.01); *B32B 2439/02* (2013.01); *B32B 2439/70* (2013.01)

(58) Field of Classification Search
CPC . B65D 2577/2025; B32B 27/08; B32B 27/10; B32B 27/306; B32B 27/36; B32B 2307/7244; B32B 2307/7246; B32B 2439/02; B32B 2439/70
See application file for complete search history.

(56) References Cited

U.S. PATENT DOCUMENTS

| | | | | |
|---|---|---|---|---|
| 5,779,050 | A | 7/1998 | Kocher et al. | |
| 5,916,615 | A * | 6/1999 | Brady | B65D 81/24 229/123.1 |
| 6,739,113 | B1 * | 5/2004 | Kocher | B65D 77/2024 53/442 |
| 2009/0250466 | A1 | 10/2009 | Fujimura | |
| 2009/0311454 | A1 * | 12/2009 | Stephens | B32B 27/16 428/41.3 |
| 2011/0204054 | A1 | 8/2011 | Huffer | |
| 2012/0152954 | A1 | 6/2012 | Bruehl et al. | |
| 2016/0176611 | A1 | 6/2016 | Wallace | |

FOREIGN PATENT DOCUMENTS

| | | | |
|---|---|---|---|
| WO | 2017053937 | A1 | 3/2017 |
| WO | 2019123382 | A1 | 6/2019 |

* cited by examiner

PACKAGES, PACKAGED PRODUCTS AND METHODS OF USE

TECHNICAL FIELD

The present application relates generally to packaging, and in particular to packages which aid in separation of packaging parts for more environmentally friendly disposal. The present application also relates to packaged products including such packages and methods of using such packages.

BACKGROUND

Conventional packages include recyclable components, such as base trays, and non-recyclable components, such as polymeric liners. Base trays with polymeric liners have been used in various applications. These applications include packaging for various items, including industrial or consumer goods products and food products. The base tray has advantages of low cost, low weight, recyclability, thermal insulation, tangible haptics, and high stiffness. The polymeric liner is added to enhance the physical properties of the base tray, including sealing properties, moisture resistance, gas barrier, grease and flavor resistance, and durability. Currently, polymeric liners are deficient in regard to recyclability such that the polymeric liner must be separated from the base tray in order to facilitate recycling of the base tray.

Often manual separation can be difficult or results in too much of the recyclable component (i.e., the base tray) and/or the non-recyclable component (i.e., the polymeric liner) remaining adhered to each other after separation. Thus, as the difficulty of separating the two components increases, the likelihood that the recyclable component will be recycled decreases.

SUMMARY

A package has been developed which includes a tray with a rigid component and a liner component. The package facilitates separation of non-recyclable and recyclable or recyclable and differentiated recyclable package components from each other after use. The package further includes a lid including a peel initiation portion and an adhered area that includes a seal between the peel initiator portion and the liner component, such that the peel initiator portion allows separation of the liner component from the rigid component.

One embodiment of the present disclosure is a package including a lid, a tray, and an adhered area. The lid includes a peel initiator portion, a remaining portion, and a lid-flange portion. The tray includes a rigid component and a liner component including a liner-flange portion. The adhered area includes a seal between the peel initiator portion and the liner component. The lid-flange portion includes the peel initiator portion and the remaining portion. The adhered area includes the lid-flange portion of the peel initiator portion and the liner-flange portion. Further, the adhered area includes 90 percent or less of the peel initiator portion.

In some embodiments, the liner-flange portion includes an edge that includes a non-linear edge portion and the adhered area includes the non-linear edge portion.

In some embodiments, the package includes a liner bond strength between the rigid component and the liner component, and a bond strength of the adhered area. The bond strength of the adhered area is greater than the liner bond strength.

In some embodiments, the peel initiator portion further includes an unadhered area adjoined to the adhered area.

In some embodiments, the peel initiator portion and the remaining portion are adjoined along a line of weakness.

In some embodiments, the rigid component includes at least one of a semi-rigid polymeric material, a rigid polymeric material, a fiber-based component, and a formable paper.

In some embodiments, the rigid component includes amorphous polyethylene terephthalate (APET).

In some embodiments, the liner component includes at least one barrier layer.

In some embodiments, a material of the rigid component and a material of the liner component have different recycling profiles.

One embodiment of the present disclosure is a method of using the previously described. The method includes providing the package and grasping the peel initiator of the lid to peelably separate the liner component from the rigid component.

One embodiment of the present disclosure is a package including a lid, a tray, and an adhered area. The lid includes a peel initiator portion, a remaining portion, and a lid edge. The tray includes a rigid component and a liner component including a liner edge. The liner edge includes a non-linear edge portion. The adhered area includes a seal between the peel initiator portion and the liner component. The lid edge includes the peel initiator portion and the remaining portion. The adhered area includes the lid edge of the peel initiator portion and the non-linear edge portion of the liner edge. Further, the adhered area includes 90 percent or less of the peel initiator portion.

In some embodiments, the package further includes a liner bond strength between the rigid component and the liner component and a bond strength of the adhered area. The bond strength of the adhered area is greater than the liner bond strength.

In some embodiments, the peel initiator includes an unadhered area adjoined to the adhered area.

In some embodiments, the peel initiator portion and the remaining portion are adjoined along a line of weakness.

One embodiment of the present disclosure is a packaged product including a lid, a tray, an adhered area, and a product. The lid includes a peel initiator portion, a remaining portion, and a lid-flange portion. The tray includes a rigid component and a liner component including a liner-flange portion edge. The adhered area includes a seal between the peel initiator portion and the liner component. The product is disposed within the tray. The lid-flange portion includes the peel initiator portion and the remaining portion. The adhered area includes the lid-flange portion of the peel initiator portion and the liner-flange portion. Further, the adhered area includes 90 percent or less of the peel initiator portion.

In some embodiments, the liner-flange portion includes an edge that includes a non-linear edge portion and the adhered area includes the non-linear edge portion.

In some embodiments, the packaged product includes a liner bond strength between the rigid component and the liner component, and a bond strength of the adhered area. The bond strength of the adhered area is greater than the liner bond strength.

In some embodiments, the peel initiator portion includes an unadhered area adjoined to the adhered area.

In some embodiments, the peel initiator portion and the remaining portion are adjoined along a line of weakness.

In some embodiments, a material of the rigid component and a material of the liner component have different recycling profiles.

There are several aspects of the present subject matter which may be embodied separately or together. These aspects may be employed alone or in combination with other aspects of the subject matter described herein, and the description of these aspects together is not intended to preclude the use of these aspects separately or the claiming of such aspects separately or in different combinations.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. It will be understood, however, that the use of a number to refer to a component in a given figure is not intended to limit the component in another figure labeled with the same number.

DETAILED DESCRIPTION

The present application describes a package including a lid, a tray, and an adhered area. The lid includes a peel initiator portion and a remaining portion. The tray includes a rigid component and a liner component including a liner-flange portion. The adhered area includes a seal between the peel initiator portion and the liner component. A lid-flange portion includes the peel initiator portion and the remaining portion. The adhered area includes the lid-flange portion of the peel initiator portion and the liner-flange portion. Further, the adhered area includes 90 percent or less of an area of the peel initiator portion. The peel initiator portion of the lid may aid in separation of the liner component from the rigid component after use of the package. Specifically, the peel initiator portion may allow a user to peelably separate the liner component from the rigid component after use so that the liner component and the rigid component can be put into appropriate waste and recycling streams. The peel initiator portion may allow separation of the liner component from the rigid component of the package without any additional material, apparatus or tools. The present disclosure may therefore provide ease in recycling of the rigid component of the package or non-rigid components if they lend themselves to being recycled.

Figure 1:
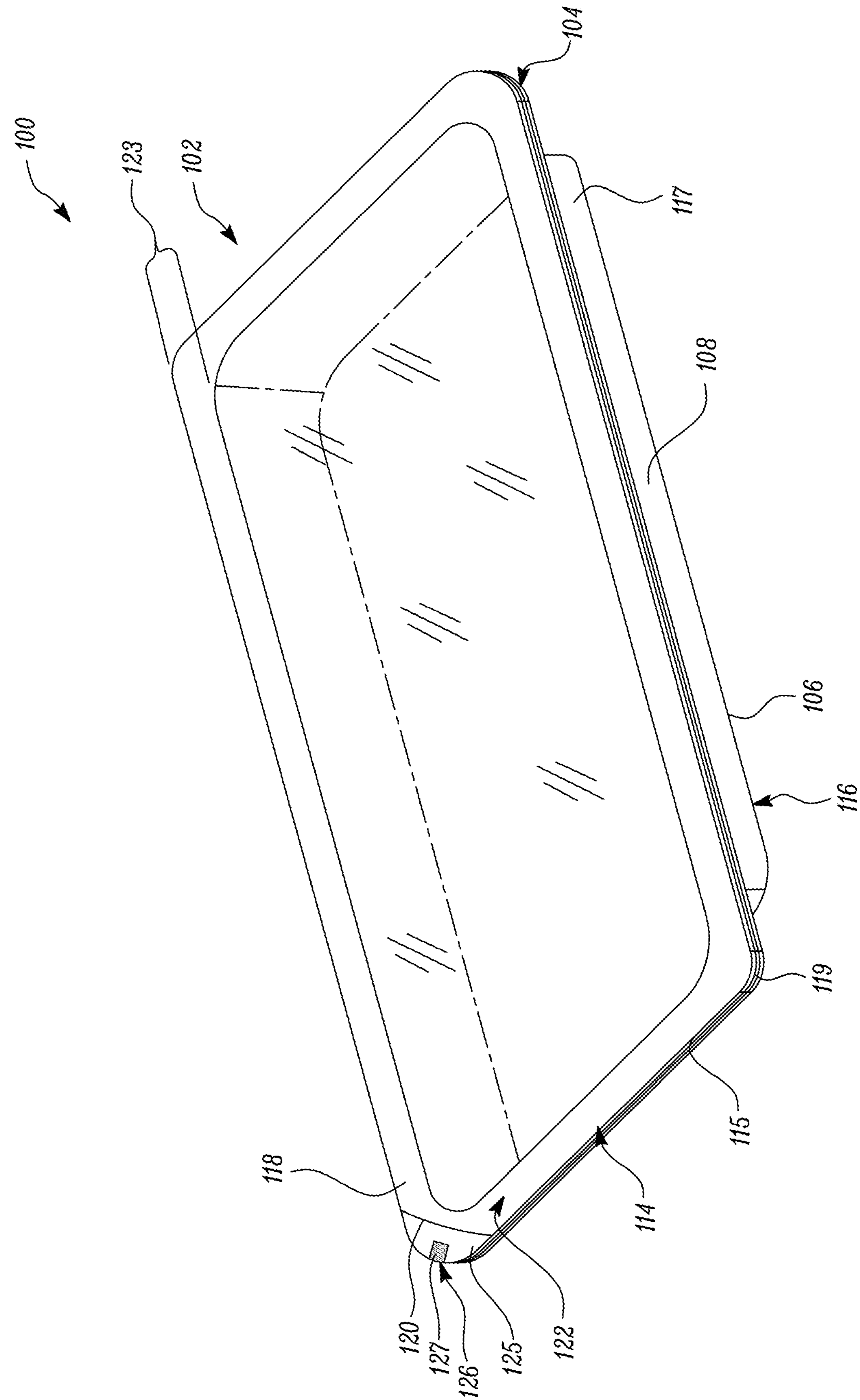
FIG. 1 illustrates a schematic perspective view of one embodiment of a package.
Figure 2:
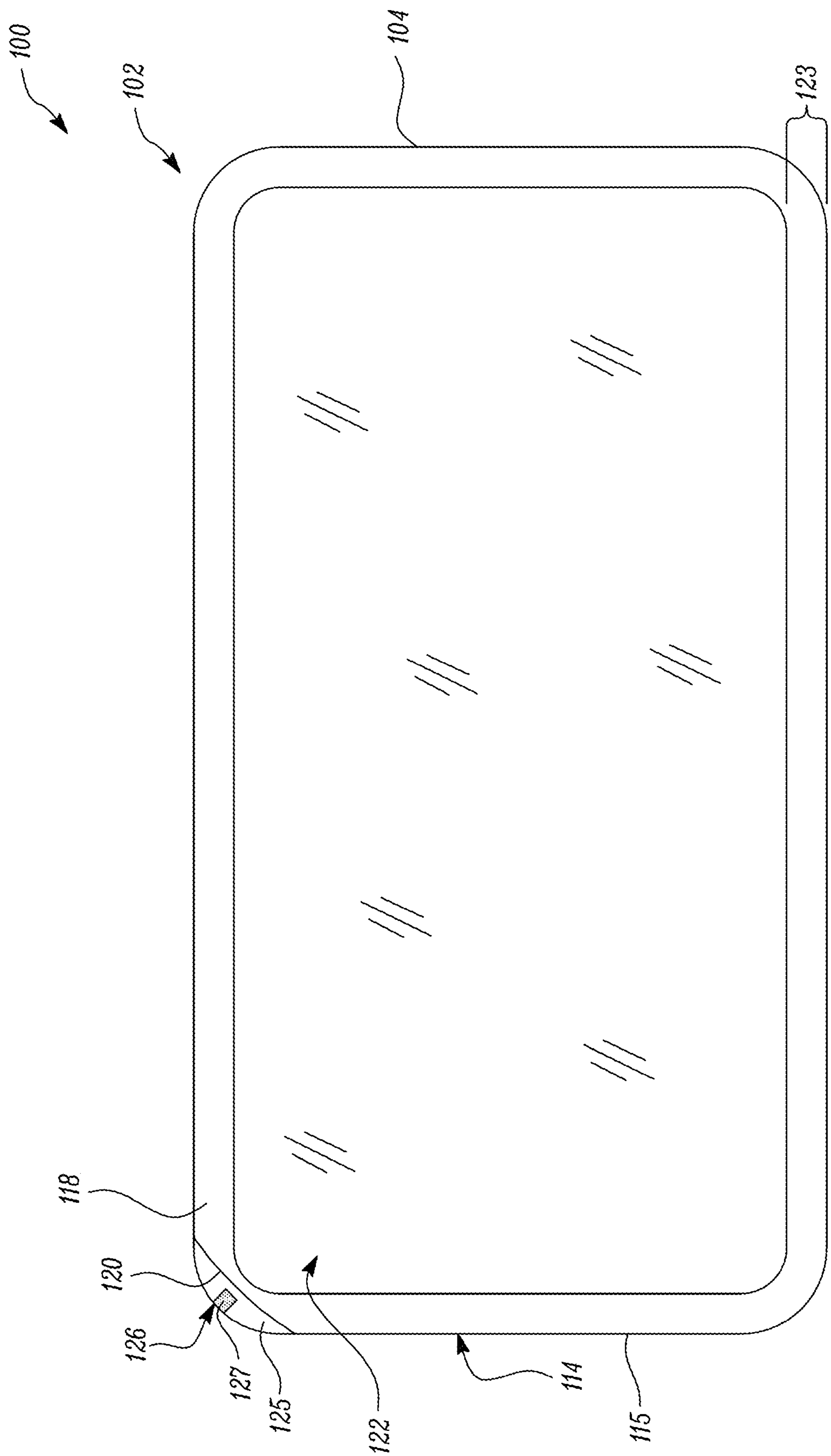
FIG. 2 illustrates a schematic top view of one embodiment of the package depicted in FIG. 1.
Figure 3:
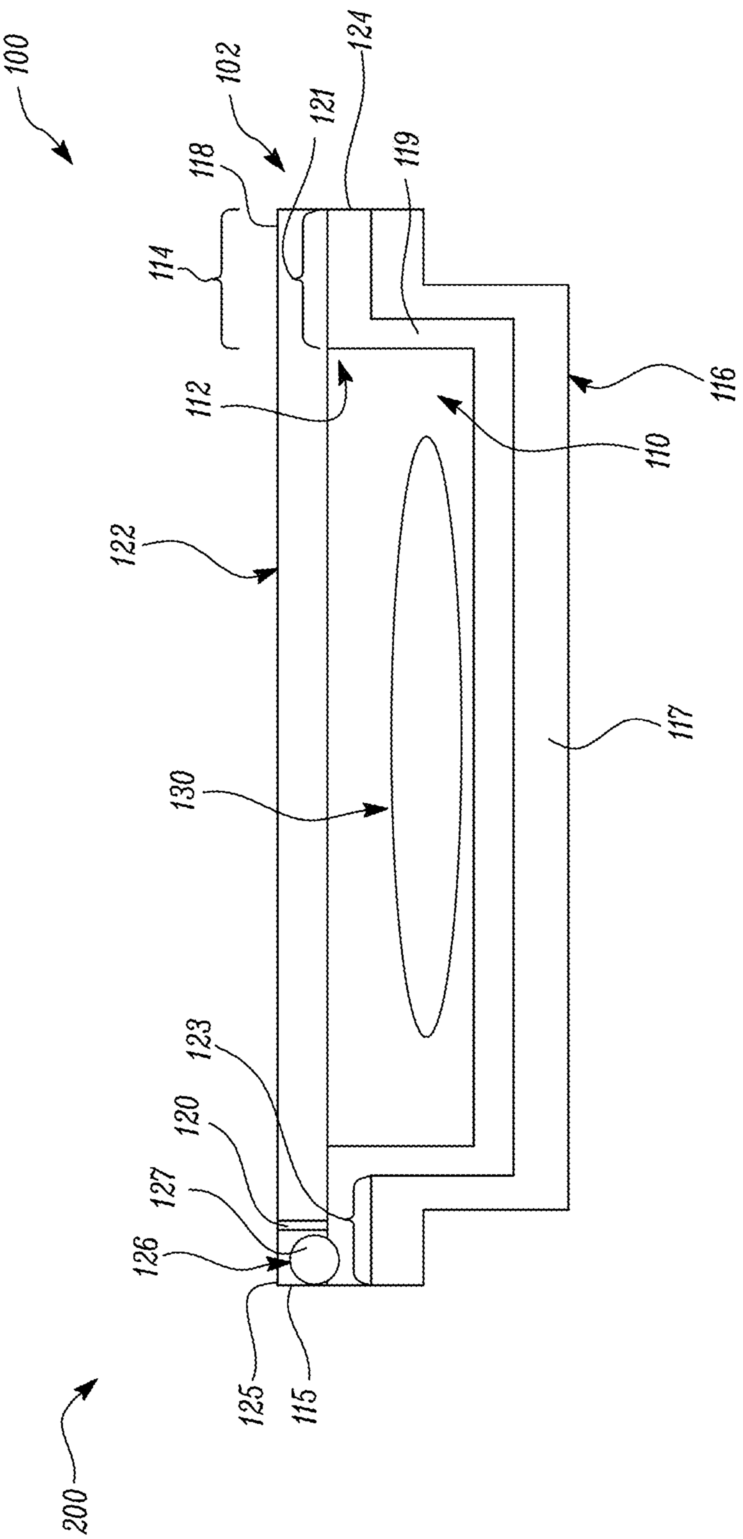
FIG. 3 illustrates a cross-sectional view of one embodiment of a packaged product.

One embodiment of a package 100 is illustrated in FIG. 1. FIG. 2 is a top view of package 100. FIG. 3 is a cross-sectional view of a packaged product 200 including package 100 and a product 130.

Referring to FIGS. 1 to 3, package 100 includes a package body 102 having a top portion 104, a bottom portion 106 and side portions 108 connecting bottom portion 106 to top portion 104. Bottom portion 106 and side portions 108 define a recessed cavity 110 (shown in FIG. 3). Top portion 104 includes an opening 112 (shown in FIG. 3) providing access to recessed cavity 110.

Bottom portion 106 and side portions 108 of package body 102 include a thermoformed tray 116 (hereinafter referred to as "tray 116"). Specifically, the combined bottom portion 106 and side portions 108 are in the form of tray 116. Tray 116 may be of any desired shape, such as, for example, rectangular, square, circular, or polygonal depending on both functional and aesthetic requirements. Tray 116 may be thermoformed to any depth as desired depending upon type and amount of product 130 to be packaged. Tray 116 includes one recessed cavity 110 in the illustrated embodiments. It should also be appreciated that tray 116 may be configured to include two or more recessed areas (not shown) depending again on both functional and aesthetic requirements of a particular packaging application.

Tray 116 includes a rigid component 117 and a liner component 119. Liner component 119 is disposed on rigid component 117, such that product 130 is disposed on liner component 119. Rigid component 117 and liner component 119 form the top portion, bottom and side portions 104, 106, 108 of package body 102. Rigid component 117 further includes a flange 123 in top portion 104. Flange 123 is defined by rigid component 117 and surrounds opening 112 of top portion 104. Liner component 119 includes a liner-flange portion 121 and a liner edge 124. Liner-flange portion 121 is a portion of liner component 119 that includes (i.e., overlies) flange 123. In some embodiments, a material of rigid component 117 and a material of liner component 119 have different recycling profiles, that is, made from different recyclable materials. In some cases, both liner component 119 and the rigid component 117 may be recyclable in separate recycling streams. In some other cases, the liner component 119 may not be recyclable and may be disposed of in a waste stream. In other cases, the liner component 119 may be recyclable and the rigid component 117 may not be recyclable and may be disposed of in a waste stream.

In some embodiments, rigid component 117 includes at least one of a semi-rigid polymeric material, a rigid polymeric material, a fiber-based component, and a formable paper. In a non-limiting example, rigid component 117 includes amorphous polyethylene terephthalate (APET). PET is a polymeric resin that is recyclable. Semi-rigid and rigid are terms that refer to different stiffness levels of rigid component 117.

In some embodiments, liner component 119 includes a thermoformable liner component material designed to be applied on rigid component 117, such that liner component 119 can be removed from rigid component 117, for example, to facilitate recycling of rigid component 117. Liner component 119 can include at least one barrier layer in order to provide favorable barrier properties, such as a low oxygen transmission rate (OTR) and/or a low moisture vapor transmission rate (MVTR). Other favorable properties of liner component 119 is that the material used to make liner component 119 (or at least the portions which contact a product) can be selected to minimize release or any inadvertent contamination of liner component 119 into package 100.

In some embodiments, liner component 119 may be relatively thin (e.g., about 4 mils to about 8 mils, equivalent to about 101.6 microns to about 203.2 microns in thickness), such that relatively little polymeric resin is required to produce it, and the process of its discard results in relatively little waste material. Being composed of a mixture of polymeric resins, liner component 119 may be practically non-recyclable. However, the ability to peel liner component 119 from rigid component 117 means that the bulkier rigid or semi-rigid component 117 of tray 116 can be recycled, while only the relatively small (less bulk) liner component 119 may need to be discarded (or incinerated) as waste material. In this way, removal of liner component 119 from rigid component 117 of tray 116 can significantly decrease the quantity and volume of refuse which must be landfilled, incinerated, or otherwise disposed of.

Package 100 further includes a lid 122. Lid 122 is disposed on top portion 104 of liner-flange portion 121 and covers opening 112. Specifically, lid 122 is disposed on liner component 119 of tray 116. Lid 122 may be made of a polypropylene film coated on one face with a pressure sensitive adhesive. In some embodiments, a thickness of lid 122 can vary from about 20 microns to about 65 microns. In some cases, lid 122 may be a multilayer film, that is, a film including more than one layer, and one of the layers may include a barrier material, such as ethylene vinyl alcohol copolymer (EVOH), or any other suitable barrier material. Lid 122 may have any suitable shape, for example, rectangular, square, polygonal, circular, or elliptical depending on both functional and aesthetic requirements that is applicable with the corresponding tray 116.

In some embodiments, the materials used in lid 122 may be such that lid 122 is attachable to liner component 119 and can exhibit one or more properties (e.g., tensile strength, barrier properties, ability to carry printing or adhesive labels, and surface appearance) required for the desired application. The material of lid 122 and the material of liner component 119 can be same or different.

Lid 122 includes a peel initiator portion 125, a remaining portion 118, and a lid edge 115. A lid-flange portion 114 includes peel initiator portion 125 and a portion of remaining portion 118. Lid-flange portion 114 corresponds to portion of lid 122 that is disposed above liner-flange portion 121 in flange 123 of rigid component 117. In the illustrated embodiment of FIGS. 1 to 3, package 100 includes a single peel initiator portion 125 disposed on lid 122. However, in other embodiments, multiple peel initiator portions 125 may be provided on lid 122. Package 100 further includes an adhered area 126. Adhered area 126 includes lid-flange portion 114 of peel initiator portion 125 and liner-flange portion 121. Specifically, adhered area 126 includes a portion of lid-flange portion 114 of peel initiator portion 125 and a portion of liner-flange portion 121 disposed below lid-flange portion 114. More specifically, adhered area 126 includes a portion of lid-flange portion 114 that includes lid edge 115 of peel initiator portion 125 and a portion of liner-flange portion 121 that includes liner edge 124. Adhered area 126 includes a seal 127 between peel initiator portion 125 and liner-flange portion 121. In other words, peel initiator portion 125 and liner-flange portion 121 are sealed to each other by seal 127. Peel initiator portion 125 is disposed in flange 123 of rigid component 117. Therefore, seal 127 is also provided in flange 123 of rigid component 117. Seal 127 may be formed by impulse, ultrasonic, pressure or other seal-forming methods. In some embodiments, seal 127 may be a thermal seal formed by heating and compressing adhered area 126 of lid 122 and a corresponding area of liner-flange portion 121. In some other embodiments, seal 127 may be formed by an adhesive disposed between adhered area 126 and liner-flange portion 121. In some cases, adhered area 126 may include lid edge 115 and liner edge 124. In some other cases, adhered area 126 may not include lid edge 115 or liner edge 124. Peel initiator portion 125 may facilitate separation or peeling of liner component 119 from rigid component 117.

Remaining portion 118 is the portion of lid 122 except for peel initiator portion 125. In some embodiments, remaining portion 118 adheres or seals with liner-flange portion 121 of liner component 119 or anywhere with liner component 119 using any suitable sealing method. A peelable seal may be formed between remaining portion 118 of lid 122 and liner-flange portion 121 in flange 123 of rigid component 117. Remaining portion 118 can be at least partially peeled from liner-flange portion 121 to provide access to recessed cavity 110. In some embodiments, remaining portion 118 is sealed to liner-flange portion 121 by a resealable seal. In some other embodiments, remaining portion 118 is sealed to liner-flange portion 121 by a non-resealable seal. In some embodiments, remaining portion 118 of lid 122 may be attached to liner-flange portion 121 by a non-peelable seal, for example, fusion seal.

Peel initiator portion 125 and remaining portion 118 are adjoined along a line of weakness 120. In some embodiments, line of weakness 120 can be at least one of a score, a cut, and a perforation that can be positioned between peel initiator portion 125 and remaining portion 118. In some cases, line of weakness 120 can be formed by mechanical scoring or cutting. In some other cases, line of weakness 120 can be formed by laser scoring or cutting.

When package 100 is opened, lid 122 is initially removed (e.g., pulled away, peeled) from tray 116 from an area other than the peel initiator portion 125 and the remaining portion 118 is separated from peel initiator portion 125 at line of weakness 120. In some cases, remaining portion 118 of lid 122 can be resealed based on application requirements. Line of weakness 120 may therefore allow peel initiator portion 125 to be attached to liner flange-portion 121 at adhered area 126 without interfering with normal use or opening of package 100.

Package 100, as shown in FIGS. 1 and 3, may be used in various packaging applications for food and non-food items. Specifically, product 130 in packaged product 200 may be food items or non-food items. For example, package 100 may be used as creamer cups, pudding cups, meat trays, etc. Package 100 may facilitate recycling of relatively small packages, such as single-portion sized packages of beverage components (e.g., ground coffee or tea) or condiments (e.g., dipping sauces, milk, cream, or non-dairy creamers). Due to the small bulk of these packages and the relative difficulty of manually peeling bound liner components from them, users may choose to forego recycling these packages. Package 100 may ease peeling of liner component 119 from small packages and thereby encourage recycling of the recyclable portions of such packages. Package 100 may also be used with medium and large sized packages for containing various items, for example, cheeses, sliced cheese, sliced meat, cuts of meat, poultry, medical supplies or components, industrial components, etc.

Figure 4B:
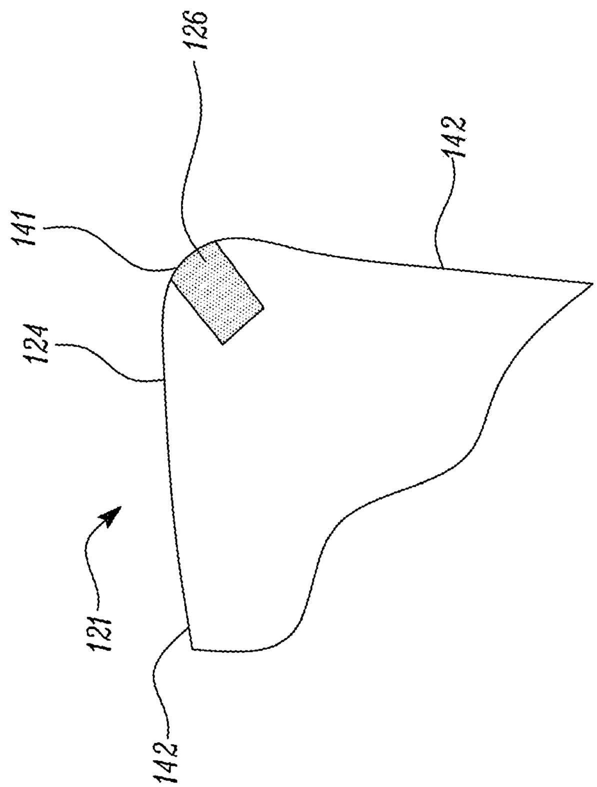
FIG. 4B illustrates a schematic top view of one embodiment of a portion of a liner edge of a liner component of the package.
Figure 4A:
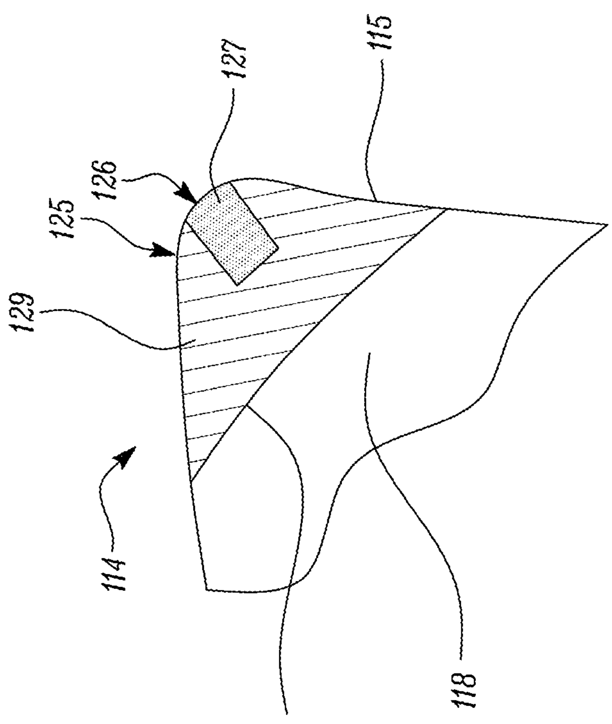
FIG. 4A illustrates a schematic top view of one embodiment of a peel initiator portion of a lid of the package.

FIG. 4A shows peel initiator portion 125 of lid 122. Referring to FIGS. 1 to 4A, peel initiator portion 125 and remaining portion 118 of lid 122 are adjoined along line of weakness 120. Peel initiator portion 125 includes adhered area 126 including seal 127. In some embodiments, adhered area 126 includes about 90 percent or less of peel initiator portion 125. In some other embodiments, the adhered area 126 includes seal 127 that includes lid edge 115 and liner edge 124. Peel initiator portion 125 further includes an unadhered area 129 adjoined to adhered area 126. Unadhered area 129 of lid 122 may be unattached (e.g., free from, not adhered, not bonded by adhesive) from liner component 119. It should be understood that unadhered area 129 of lid 122 may include low levels of adhesion to the liner component 119, for example, 100 g/25.4 mm or less. In these instances, manufacturing operations may impose static forces or pressure between the unadhered area 129 and the liner component 119 materials resulting in low or essentially no level of adhesion. Unadhered area 129 can function as a graspable portion (e.g., handle, shank, grip) and can be grasped by a user to separate liner component 119 from rigid component 117. For example, unadhered area 129 may facilitate peeling of liner component 119 from the rigid component 117 in the peel initiation portion 125. The unadhered area 129 may provide a sufficient amount of material for a user to grasp onto that allows for pulling (e.g., peeling) the liner component 119 from the rigid component 117 without ergonomic issue. Unadhered area 129 may eliminate the need of a tab (e.g., material that extends beyond the lid edge 115 and/or the liner edge 124 that may serve as a graspable feature). For example, a tab may be a separate material attached to liner component, placed in between liner component and rigid component, or an extension of liner component.

As shown in FIG. 4B, liner edge 124 includes a non-linear edge portion 141 and a linear edge portion 142. Referring to FIGS. 1 to 4B, liner-flange portion 121 has a shape that conforms to a shape of flange 123 of rigid component 117. In the illustrated embodiment, non-linear edge portion 141 corresponds to a rounded (e.g., arcuate) portion of liner-flange portion 121, while linear edge portion 142 corresponds to straight portions adjoining non-linear edge portion 141. Adhered area 126 includes lid-flange portion 114 of peel initiator portion 125 and liner-flange portion 121. In other words, adhered area 126 also includes a corresponding area of liner-flange portion 121. That is, the lid edge 115 and the liner edge 124, which may include non-linear and linear edge portions 141, 142, may correspond to each other in peel initiator portion 125. Adhered area 126 includes non-linear edge portion 141 of lid-flange portion 114. Accordingly, adhered area 126 can be located in non-linear edge portion 141 of lid-flange portion 114.

In the illustrated embodiment, peel initiator portion 125 is substantially triangular in shape with a rounded (e.g., arcuate) corner. However, any other shape of peel initiator portion 125 is possible within the scope of the present disclosure. Exemplary shapes include circular, elliptical, rectangular, square, oval, trapezoidal, polygonal, etc. Further, peel initiator portion 125 is located in a rounded corner of flange 123 of rigid component 117. However, any other location of peel initiator portion 125 on flange 123 is possible within the scope of the present disclosure (e.g., linear, non-linear or arcuate edge portions).

In some embodiments, material in the peel initiator portion 125 can be made thicker than remaining portion 118 for better grasp by user. This may be achieved by adding one or more additional layers of film to peel initiator portion 125.

In some embodiments, peel initiator portion 125 can be provided with one or more protrusions (e.g., embossments, texture) to improve grasping of peel initiator portion 125 by the user in different circumstances, such as in applications involving slippery or oily products. Peel initiator portion 125 can have any suitable shape and dimensions on flange 123 of rigid component 117. Peel initiator portion 125 can be colored, textured, embossed, or provided with any other attribute to differentiate it from remaining portion 118.

Further, in the illustrated embodiment, adhered area 126 has a substantially rectangular shape. However, adhered area 126 may have any alternative shape, for example, circular, elliptical, oval, triangular, polygonal, irregular, etc.

Package 100 further includes a liner bond strength between rigid component 117 and liner component 119, and a bond strength of adhered area 126. In some embodiments, the bond strength of the adhered area 126 is greater than the liner bond strength. This may enable peeling of the liner component 119 from the rigid component 117 by grasping or pulling peel initiator portion 125 without failure or rupture of adhered area 126. In some embodiments, multiple adhered areas 126 can be included in peel initiator portion 125 to increase bond strength between peel initiator portion 125 and liner-flange portion 121.

FIGS. 5A-5H illustrate peel initiator portion 125 with different shapes, areas, and locations of the adhered area 126. The adhered area 126 may be provided with different areas, locations, and shapes based on application requirements (e.g., form-fill seal or pre-form tray applications). The parameters of the adhered area 126 may be selected to allow easy peeling of liner component 119 from rigid component 117 with the peel initiator portion 125. Further, unadhered area 129 may provide a sufficient area of material for grasping of peel initiator portion 125 for the user. Moreover, the bond strength of the adhered area 126 may be high enough to avoid any undesired peeling of peel initiator portion 125 from liner-flange portion 121.

Figure 5A:
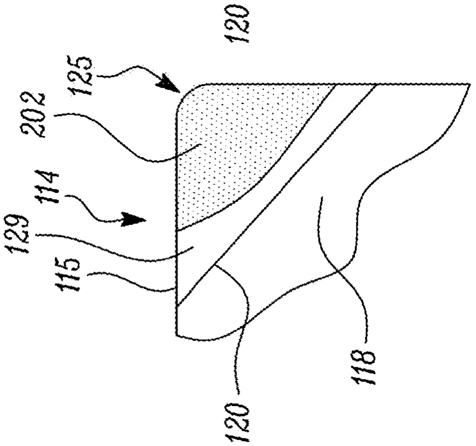
FIGS. 5A-5H illustrate schematic top views of various embodiments of the peel initiator portion having different adhered areas.

FIGS. 5A-5H in conjunction with FIGS. 1-4 will be discussed in detail below. FIG. 5A shows an adhered area 202 that is about 80 percent of an area of peel initiator portion 125. Further, adhered area 202 includes a rounded corner (arcuate edge) and linear edges of peel initiator portion 125 that include lid edge 115 and liner edge 124.

Figure 5B:
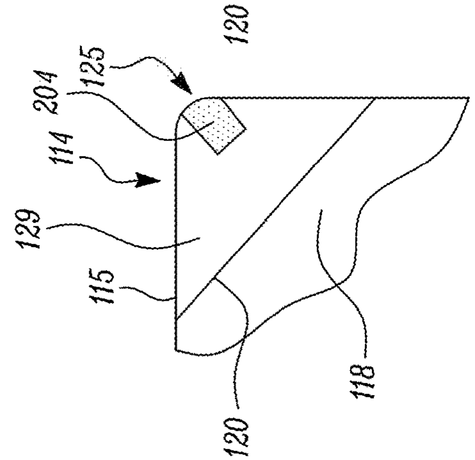

FIG. 5B shows an adhered area 204 that is about 20 percent or less of the area of peel initiator portion 125. Adhered area 204 includes the rounded corner of peel initiator portion 125 that includes lid edge 115 and liner edge 124.

Figure 5C:
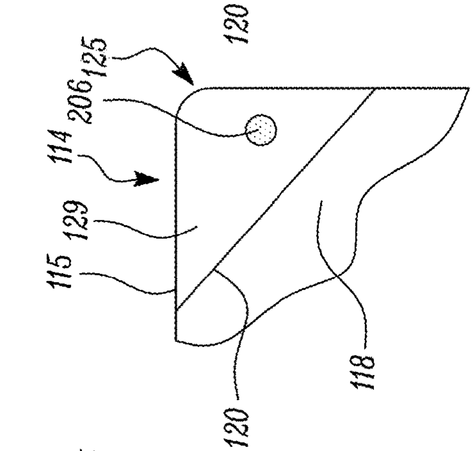

FIG. 5C shows an adhered area 206 that is about 10 percent or less of the area of peel initiator portion 125. Further, adhered area 206 does not include any of the lid or liner edges 115, 124 of peel initiator portion 125.

Figure 5D:
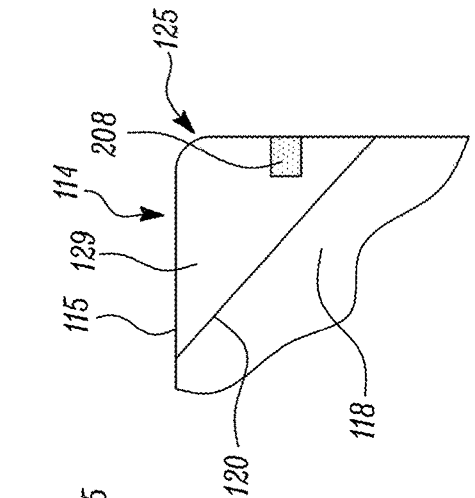

FIG. 5D shows an adhered area 208 that is about 15 percent or less of the area of peel initiator portion 125. Further, adhered area 208 includes one of the linear edges of lid edge 115 and liner edge 124 of peel initiator portion 125.

Figure 5E:
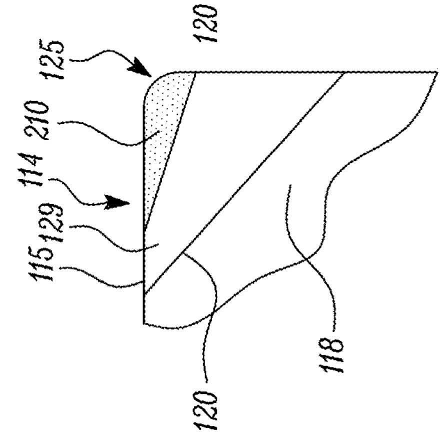

FIG. 5E shows an adhered area 210 that is about 30 percent or less of the area of peel initiator portion 125. Adhered area 208 further includes the lid edge 115 and the liner edge 124 of peel initiator portion 125.

Figure 5F:
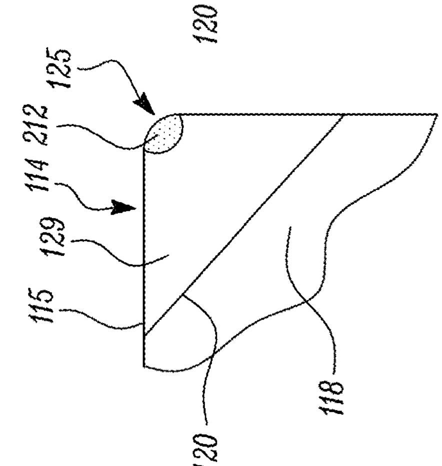

FIG. 5F shows an adhered area 212 that is about 15 percent or less of the area of peel initiator portion 125. Adhered area 212 includes the lid edge 115 and the liner edge 124 of peel initiator portion 125. A geometry of adhered area 212 shown in FIG. 5F is different from a geometry of adhered area 204 shown in FIG. 5B. However, locations of adhered areas 204, 212 relative to peel initiator portion 125 may be substantially similar.

Figure 5G:
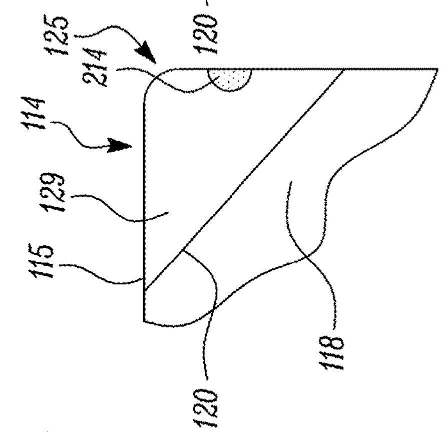

FIG. 5G shows an adhered area 214 that is about 15 percent or less of the area of peel initiator portion 125. Adhered area 214 also includes lid edge 115 and liner edge 124 of peel initiator portion 125. A geometry of adhered area 214 shown in FIG. 5G is similar to the geometry of adhered area 212 shown in FIG. 5F. However, locations of adhered areas 212, 214 are different.

Figure 5H:
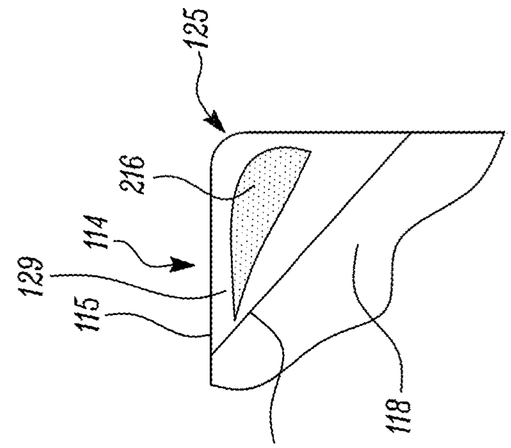

FIG. 5H shows an adhered area 216 that is about 50 percent or less of the area of peel initiator portion 125. Adhered area 216 does not include the lid edge 115 or the liner edge 124 of peel initiator portion 125.

In some embodiments, the adhered area 126, 202, 204, 206, 208, 210, 212, 214, 216 may be from greater than 0 percent to 90 percent of the area of the peel initiator portion 125. For example, the adhered area 126, 202, 204, 206, 208, 210, 212, 214, 216 may be 90 percent, 85 percent, 80 percent, 70 percent, 60 percent, 50 percent, 40 percent, 30 percent, 20 percent, 10 percent, 5 percent, or any percentage therebetween and greater than 0 percent of the area of the peel initiator portion 125.

In some embodiments, a method may be provided which includes providing package 100. Further, the method may include grasping peel initiator portion 125 of lid 122 to peelably separate liner component 119 from rigid component 117.

Figure 6B:
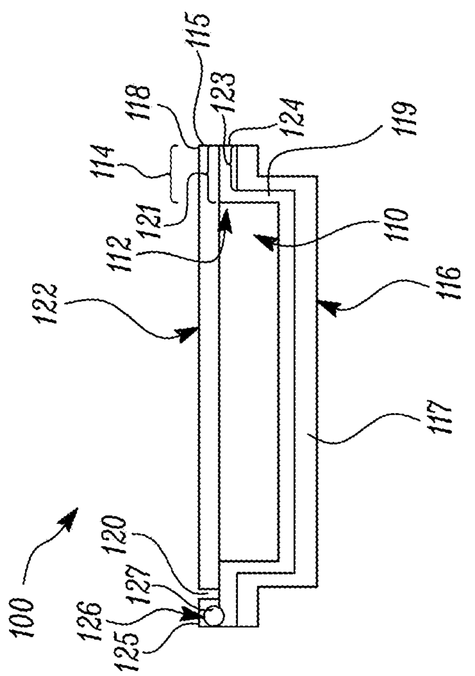
FIGS. 6A-6C illustrate an exemplary method of using the package.
Figure 6C:
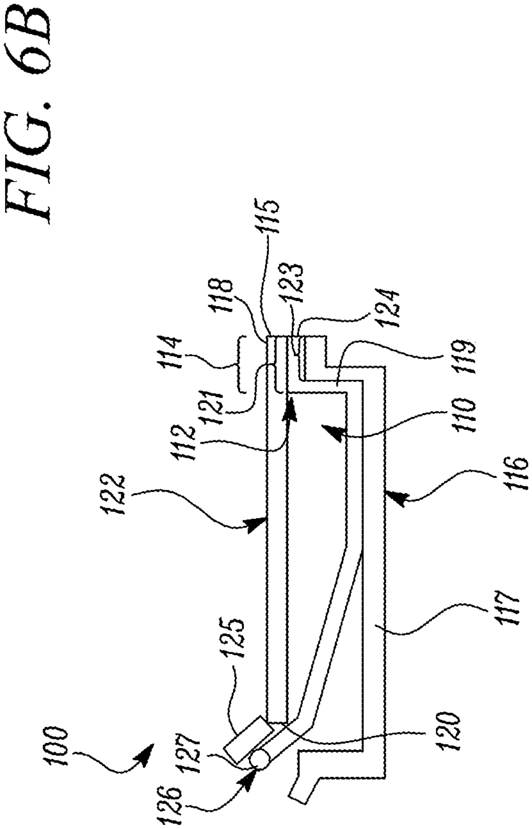
Figure 6A:
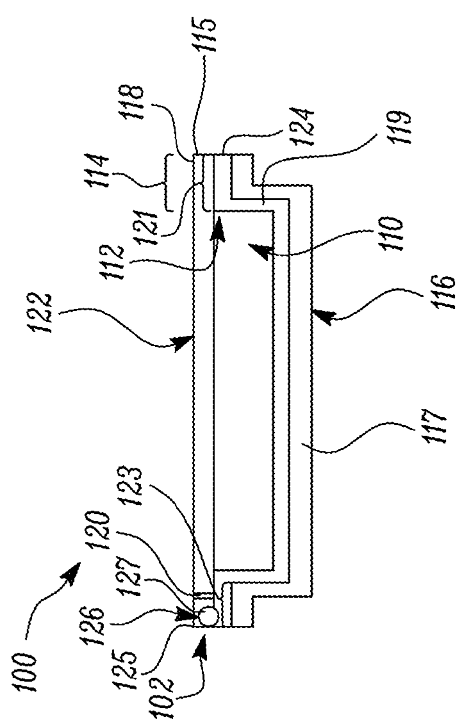
Figure 7B:
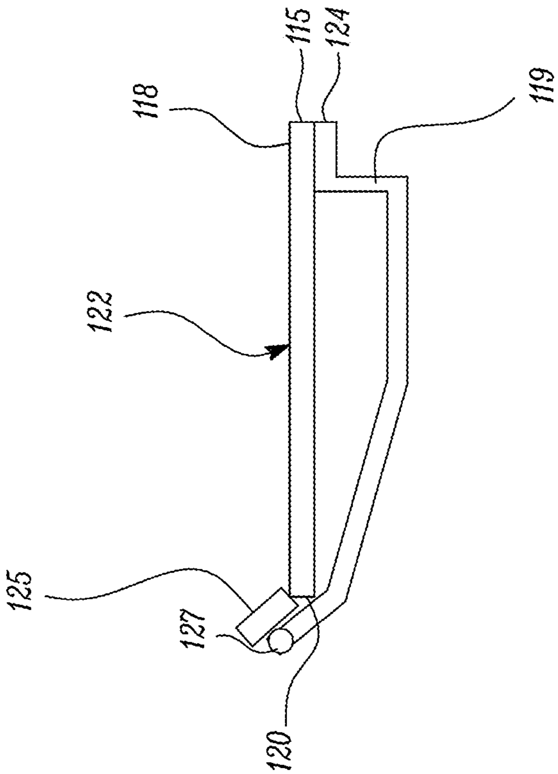
FIG. 7A-7B illustrate schematic views of a tray and a liner component coupled to a lid, respectively, after separation of the tray from the liner component.
Figure 7A:
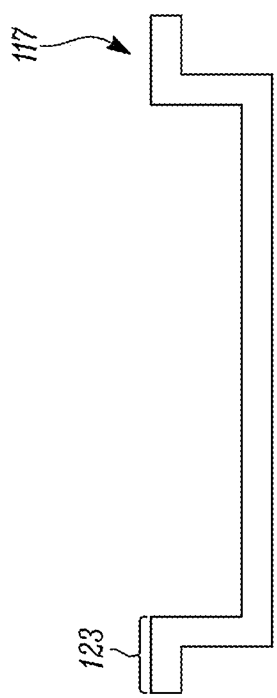

FIGS. 6A-6C illustrate a first method of using package 100. In some embodiments, the first method includes providing package 100. The first method further includes grasping peel initiator portion 125 to peelably separate liner component 119 from rigid component 117, and more specifically, grasping unadhered area 129. A user may implement the first method before disposing package 100. The user may separate remaining portion 118 from peel initiator portion 125 along line of weakness 120, as illustrated with reference to FIGS. 6A and 6B. In an example, when lid 122 is opened by the user, the remaining portion 118 may separate from peel initiator portion 125 along line of weakness 120 (see enlarged gap of line of weakness 120 in FIG. 6B when compared to FIG. 6A). Lid 122 is opened to gain access to the contents of package 100. In the illustrated method, remaining portion 118 may be resealable or reclosable. This may allow opening of lid 122 of package 100 to gain access to the contents, followed by resealing of remaining portion 118 to obtain the configuration of package 100, as illustrated in FIG. 6B. In some cases, the user may reseal remaining portion 118 to liner component 119 before disposal of package 100. Then, the user may grasp peel initiator portion 125, or more specifically, unadhered area 129 and initiate removal of liner component 119 (attached to peel initiator portion 125 by adhered area 126) from rigid component 117 of tray 116, as shown in FIG. 60. The bond strength between peel initiator portion 125 and liner edge 121 is greater than the bond strength between liner edge 121 and rigid component 117. This difference in bond strength may facilitate peeling of liner-flange portion 121 and, or liner edge 125 from rigid component 117, as illustrated in FIG. 6C. With reference to FIGS. 7A-7B, this difference in bond strength may allow fast, convenient and user-friendly separation of liner component 119 and lid 122 including peel initiator portion 125 and remaining portion 118 (illustrated in FIG. 7B) from rigid component 117 (illustrated in FIG. 7A), for desired recycling.

In some cases, liner component 119 and lid 122 may be recyclable in a recycling stream that is different from that of rigid component 117. Separation of liner component 119 and lid 122 from rigid component 117 may therefore be required before recycling.

FIGS. 7A-7B illustrate rigid component 117 separated from liner component 119 and lid 122. In some embodiments, rigid component 117 includes APET (Amorphous polyethylene terephthalate), which is recyclable. Therefore, after separation from liner component 119, rigid component 117 can be recycled, while liner component 119 together with lid 122 may be recycled or disposed accordingly. Simultaneous removal of both liner component 119 and lid 122 may be possible in case of resealable attachment between remaining portion 118 of lid 122 and liner edge 121 of liner component 119.

In some embodiments, the bond strength of adhered area 126 is greater than liner bond strength between rigid component 117 and liner component 119. More particularly, the bond strength between liner-flange portion 121 of liner component 119 and peel initiator portion 125 of lid 122 is greater than the liner bond strength between liner component 119 and rigid component 117 of tray 116. Therefore, during removal of liner component 119, rigid component 117 is left in its original state (it is not cut, bent, folded, scored, altered, etc.), while liner component 119 remains adhered to peel initiator portion 125 and can be subsequently peeled from rigid component 117.

Figure 8B:
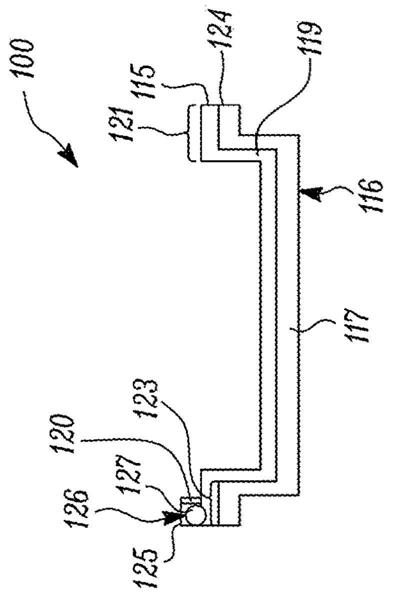
FIGS. 8A-8C illustrate another exemplary method steps of using the package.
Figure 8C:
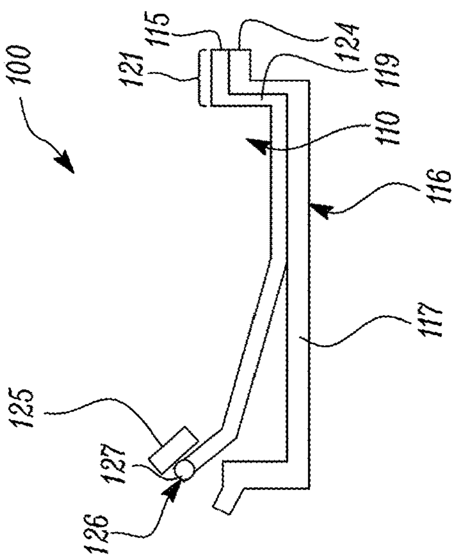
Figure 8A:
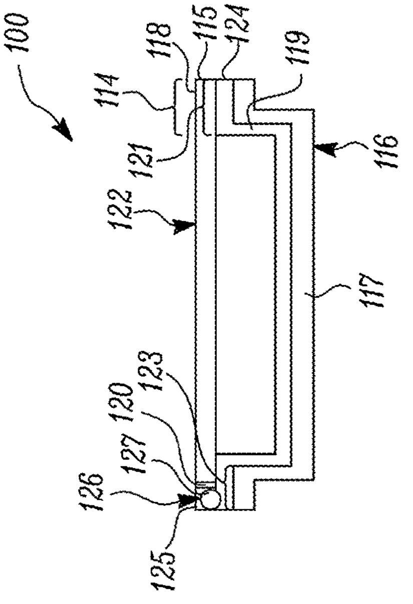

FIGS. 8A-8C illustrate a second method of using package 100. In the second method, remaining portion 118 of lid 122 is removed prior to disposing package 100, as illustrated in FIG. 8B. However, liner component 119 and peel initiator portion 125 of lid 122 remain adhered to each other by seal 127. When package 100 is opened, the user separates remaining portion 118 of lid 122 from peel initiator portion 125 at line of weakness 120. This may allow removal of remaining portion 118, while retaining peel initiator portion 125. As shown in FIG. 8C, liner component 119 is peeled from rigid component 117 by grasping and pulling unadhered area 129 of peel initiator portion 125. Rigid component 117 may be then recycled, while liner component 119 may be recycled or disposed.

As used herein, "peel strength" is the measure of the average force to part two bonded materials such as tape, labels, textile, or plastic films. The strength is calculated during a peel test (ASTM F88) at a constant speed rate by dividing the average force required during the test by the unit width of the bonded samples. As will be evident to a person having knowledge in the art, lidding (i.e., lid 122) to liner component 119 can change such as to yield a range of peel strengths. The range of the peel strengths listed in the present disclosure shall be wide enough to cover both peak and average peel strengths, however the present disclosure is not to be limited by the peel strengths in any manner.

In some embodiments, package 100 of the present disclosure may have different values of peel strength between different components, layers, and the like. The peel strength between liner component 119 and rigid component 117 may be based upon various parameters, for example, peeling location, peeling action, type, location, style etc. of peeling action by users. The peel strength for liner component 119 to rigid component 117 in case of flat sheet or strip taken from bottom portion 106 of tray 116 may be in the range from about 300 grams/inch (g/in equal to g/25.4 mm) to about 1,500 g/in. The peel strength for liner component 119 to rigid component 117, if peeling from the corner of flange 123 (shown in FIG. 3) or peel initiator portion 125, may be in the range from about 500 g/in to about 2,500 Win. The peel strength for liner component 119 to rigid component 117, if peeling from around the center of flange 123 of rigid component 117, may be in the range from about 2,000 Win to about 6,500 g/in. Further, the bond strength between rigid component 117 and liner component 119 may change with a thickness of tray 116. The peel strength between lid 122 and liner component 119 may be in the range from about 400 g/in to about 4,000 Win (fusion seal or non-peelable liddings can have a value greater than 5,000 g/in in some embodiments). In some embodiments, the bond strength of adhered area 126 including seal 127 may be greater than 3,000 Win. In some other embodiments, the bond strength of adhered area 126 including seal 127 may be greater than 5,000 Win.

Figure 9B:
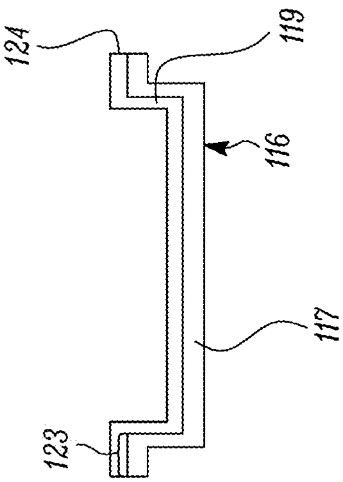
FIGS. 9A-9C illustrate an exemplary method of manufacturing the package.
Figure 9C:
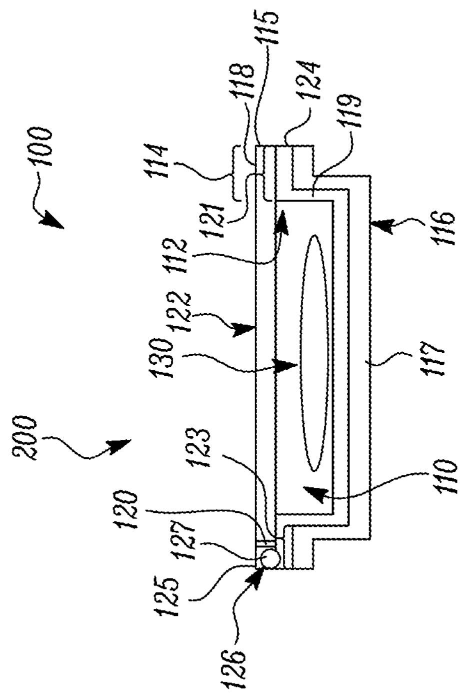
Figure 9A:
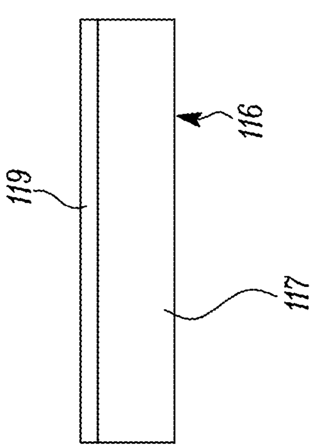

FIGS. 9A-9C illustrate a method of manufacture of packaged product 200. The method involves selecting rigid component 117 of any suitable polymeric thermoformable material know in the art. In the present disclosure, APET (Amorphous polyethylene terephthalate) may be the material of choice, which is a polymeric resin and has many advantageous characteristics as already discussed above. After selecting the material of rigid component 117, the material of liner component 119 may be selected. Again, liner component 119 can be made of any suitable thermoformable material known in the art. Different possibilities of materials for liner component 119 have already been discussed above in greater detail. After selecting the materials for rigid component 117 and liner component 119, rigid component 117 and liner component 119 are adhered or sealed together, as illustrated in FIG. 9A, using any suitable sealing method. In FIG. 9A, rigid and liner components 117, 119 are in the form of sheets.

In some embodiments, composition of liner component 119 and the amount of, or thickness of, rigid component 117 can vary the bond strength. Further, the bond strength is altered based on the draw depth due to the added stresses imposed on the bonds when being formed into a package.

After adhering together, liner component 119 and rigid component 117 form a multilayer component on which thermoforming is performed to form a component in the shape of tray 116, as shown in FIG. 9B. In the most common method of high-volume, continuous thermoforming of this multilayer component, the multilayer component is fed from a roll or from an extruder into a set of indexing chains that incorporate pins or spikes for piercing the multilayer component and transporting it through an oven for heating to forming temperature of approximately 280 degrees Fahrenheit (138 degrees Celsius). The heated multilayer component then indexes into a form station where a mating mold and a pressure-box close on the multilayer component, with vacuum then applied to remove trapped air and to pull the material into or onto the mold along with pressurized air to form the multilayer component to the detailed shape of the mold.

After tray 116 is formed, product 130 to be packaged may be placed in recessed cavity 110 of tray 116. Lid 122 is then applied to tray 116. Seal 127 may be formed to seal or adhere peel initiator portion 125 of lid 122 to liner edge 121. A different sealing method may be used to attach liner edge 121 to remaining portion 118 of lid 122. Typically, the bond strength of seal 127 is greater than a bond strength between remaining portion 118 of lid 122 and liner edge 121. Further, the bond strength of adhered area 126 is greater than the bond strength between rigid component 117 and liner component 119. Lid 122 is then divided into two portions namely peel initiator portion 125 and remaining portion 118 by forming line of weakness 120, as illustrated in FIG. 9C. Line of weakness 120 may be formed mechanically or by laser, as discussed above. In some embodiments, line of weakness 120 is first formed in lid 122, and then lid 122 attached to liner edge 121.

Embodiments

Package Embodiments

A. A package comprising:
 a lid comprising a peel initiator portion, a remaining portion and a lid-flange portion;
 a tray comprising a rigid component and a liner component comprising a liner-flange portion; and
 an adhered area comprising a seal between the peel initiator portion and the liner component;
 wherein the lid-flange portion comprises the peel initiator portion and the remaining portion, wherein the adhered area comprises the lid-flange portion of the peel initiator portion and the liner-flange portion, and wherein the adhered area comprises 90 percent or less of the peel initiator portion.

B. The package according to embodiment A, wherein the liner-flange portion comprises an edge comprising a non-linear edge portion and the adhered area comprises the non-linear edge portion.

C. The package according to any other embodiment, further comprising a liner bond strength between the rigid component and the liner component and a bond strength of the adhered area, and wherein the bond strength of the adhered area is greater than the liner bond strength.

D. The package according to any other embodiment, wherein the peel initiator portion further comprises an unadhered area adjoined to the adhered area.

E. The package according to any other embodiment, wherein the peel initiator portion and the remaining portion are adjoined along a line of weakness.

F. The package according to any other embodiment, wherein the rigid component comprises at least one of a semi-rigid polymeric material, a rigid polymeric material, a fiber-based component and a formable paper.

G. The package according to any other embodiment, wherein the rigid component comprises amorphous polyethylene terephthalate (APET).

H. The package according to any other embodiment, wherein the liner component comprises at least one barrier layer.

I. The package according to any other embodiment, wherein a material of the rigid component and a material of the liner component have different recycling profiles.

J. A method of using the package according to any other embodiment, the method comprising the steps of:
 providing the package; and
 grasping the peel initiator portion of the lid to peelably separate the liner component from the rigid component.

K. A package comprising:
 a lid comprising a peel initiator portion, a remaining portion and a lid edge;
 a tray comprising a rigid component and a liner component comprising a liner edge, the liner edge comprising a non-linear edge portion; and
 an adhered area comprising a seal between the peel initiator portion and the liner component;

wherein the lid edge comprises the peel initiator portion and the remaining portion, wherein the adhered area comprises the lid edge of the peel initiator portion and the non-linear edge portion of the liner edge, and wherein the adhered area comprises 90 percent or less of the peel initiator portion.

L. The package of any embodiment, wherein a material of the rigid component and a material of the liner component have different recycling profiles.

Packaged Product Embodiments

M. A packaged product comprising:
a lid comprising a peel initiator portion, a remaining portion and a lid-flange portion;
a tray comprising a rigid component and a liner component comprising a liner-flange portion;
an adhered area comprising a seal between the peel initiator portion and the liner component; and
a product disposed within the tray;
wherein the lid-flange portion comprises the peel initiator portion and the remaining portion, wherein the adhered area comprises the lid-flange portion of the peel initiator portion and the liner-flange portion, and wherein the adhered area comprises 90 percent or less of the peel initiator portion.

N. The packaged product according to any other embodiment, wherein the liner-flange portion comprises an edge comprising a non-linear edge portion and the adhered area comprises the non-linear edge portion.

O. The packaged product according to any other embodiment, further comprising a liner bond strength between the rigid component and the liner component and a bond strength of the adhered area, and wherein the bond strength of the adhered area is greater than the liner bond strength.

P. The packaged product according to any other embodiment, wherein the peel initiator portion further comprises an unadhered area adjoined to the adhered area.

Q. The packaged product according to any other embodiment, wherein the peel initiator portion and the remaining portion are adjoined along a line of weakness.

R. The packaged product according to any other embodiment, wherein a material of the rigid component and a material of the liner component have different recycling profiles.

S. The packaged according to any other embodiment, wherein the rigid component comprises at least one of a semi-rigid polymeric material, a rigid polymeric material, a fiber-based component and a formable paper.

Each and every document cited in this present application, including any cross referenced, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application governs.

The description, examples, embodiments, and drawings disclosed are illustrative only and should not be interpreted as limiting. Unless expressly indicated to the contrary, the numerical parameters set forth in the present application are approximations that can vary depending on the desired properties sought to be obtained by a person of ordinary skill in the art without undue experimentation using the teachings disclosed in the present application. Modifications and other embodiments will be apparent to a person of ordinary skill in the packaging arts, and all such modifications and other embodiments are intended and deemed to be within the scope of the present invention.

The invention claimed is:

1. A package comprising:
a lid comprising a peel initiator portion and a remaining portion adjoined by a line of weakness;
a tray comprising a rigid component and a liner component comprising a liner-flange portion; and
an adhered area comprising a seal between the peel initiator portion and the liner component;
wherein the adhered area comprises the peel initiator portion and the liner-flange portion, wherein the adhered area comprises 90 percent or less of an area of the peel initiator portion, and wherein the peel initiator portion facilitates removal of the liner component from the rigid component.

2. The package of claim 1, wherein the liner-flange portion comprises an edge comprising a non-linear edge portion and the adhered area comprises the non-linear edge portion.

3. The package of claim 1, further comprising a liner bond strength between the rigid component and the liner component and a bond strength of the adhered area, and wherein the bond strength of the adhered area is greater than the liner bond strength.

4. The package of claim 1, wherein the peel initiator portion further comprises an unadhered area adjoined to the adhered area.

5. The package of claim 1, wherein the rigid component comprises at least one of a semi-rigid polymeric material, a rigid polymeric material, a fiber-based component and a formable paper.

6. The package of claim 1, wherein the rigid component comprises amorphous polyethylene terephthalate (APET).

7. The package of claim 1, wherein the liner component comprises at least one barrier layer.

8. The package of claim 1, wherein a material of the rigid component and a material of the liner component have different recycling profiles.

9. A method of using the package of claim 1, the method comprising the steps of:
providing the package; and
grasping the peel initiator portion of the lid to peelably separate the liner component from the rigid component.

10. A package comprising:
a lid comprising a peel initiator portion is adjoined to a remaining portion along a line of weakness, and a lid edge;
a tray comprising a rigid component and a liner component comprising a liner edge, the liner edge comprising a non-linear edge portion; and
an adhered area comprising a seal between the peel initiator portion and the liner component;
wherein the lid edge comprises the peel initiator portion and the remaining portion, wherein the adhered area comprises the lid edge of the peel initiator portion and the non-linear edge portion of the liner edge, wherein the adhered area comprises 90 percent or less of the peel initiator portion, and wherein the peel initiator portion facilitates removal of the liner component from the rigid component.

11. The package of claim 10, further comprising a liner bond strength between the rigid component and the liner component and a bond strength of the adhered area, and wherein the bond strength of the adhered area is greater than the liner bond strength.

12. The package of claim 10, wherein the peel initiator further comprises an unadhered area adjoined to the adhered area.

13. A packaged product comprising:

a lid comprising a peel initiator portion and a remaining portion adjoined by a line of weakness;

a tray comprising a rigid component and a liner component comprising a liner-flange portion;

an adhered area comprising a seal between the peel initiator portion and the liner component; and a product disposed within the tray;

wherein the adhered area comprises the lid flange portion of the peel initiator portion and the liner-flange portion, wherein the adhered area comprises 90 percent or less of an area of the peel initiator portion, and wherein the peel initiator portion facilitates removal of the liner component from the rigid component.

14. The packaged product of claim 13, wherein the lid comprises an edge comprising a non-linear edge portion and the adhered area comprises the non-linear edge portion.

15. The packaged product of claim 13, further comprising a liner bond strength between the rigid component and the liner component and a bond strength of the adhered area, and wherein the bond strength of the adhered area is greater than the liner bond strength.

16. The packaged product of claim 13, wherein the peel initiator portion further comprises an unadhered area adjoined to the adhered area.

17. The packaged product of claim 13, wherein a material of the rigid component and a material of the liner component have different recycling profiles.

* * * * *